(12) United States Patent
Descoteaux et al.

(10) Patent No.: US 6,467,339 B1
(45) Date of Patent: Oct. 22, 2002

(54) METHOD FOR DEPLOYING SHROUD SEGMENTS IN A TURBINE ENGINE

(75) Inventors: Samuel S. Descoteaux, South Glastonbury; Troy A. Braman, Torrington, both of CT (US)

(73) Assignee: United Technologies Corporation, Hartford, CT (US)

( * ) Notice: Subject to any disclaimer, the term of this patent is extended or adjusted under 35 U.S.C. 154(b) by 149 days.

(21) Appl. No.: 09/615,902

(22) Filed: Jul. 13, 2000

(51) Int. Cl.$^7$ ............................................. G01M 15/00
(52) U.S. Cl. ........................................ 73/119 R; 73/116
(58) Field of Search ................................ 73/116, 117.2, 73/117.3, 117.4, 118.1, 119 R

(56) References Cited

U.S. PATENT DOCUMENTS

| | | | | |
|---|---|---|---|---|
| 5,439,348 A | * | 8/1995 | Hughes et al. | 29/889.2 |
| 5,460,488 A | * | 10/1995 | Spear et al. | 416/191 |
| 6,341,938 B1 | * | 1/2002 | Zegarski et al. | 415/173.4 |

* cited by examiner

*Primary Examiner*—Eric S. McCall
(74) *Attorney, Agent, or Firm*—Kenneth C. Baran

(57) ABSTRACT

The invention is a method for allocating shroud or airseal segments among various positions in a turbomachinery case when the segments to be allocated differ in radial dimension or thickness and when the requirement for segment thickness varies around the circumference of the case. According to the inventive method, segment thicknesses are preliminarily assigned to positions on the case without regard for whether or not the thickness of each assigned segment satisfies the thickness requirement of its assigned position. Each thickness is then compared to the requirement of its assigned position and thicknesses that fail to satisfy the minimum thickness requirement of their assigned positions are consigned to a pool of noncompliant thickness values, thereby vacating zero or more positions Members of the pool are then systematically evaluated for suitability in the vacated positions. Ideally, the evaluation considers the seals in order of diminishing thickness and progresses in descending order through the thickness requirements. The inventive method quickly identifies an optimum distribution of segments among the various positions in the case.

7 Claims, 6 Drawing Sheets

FIG.4

| 1 | 2 | | 3 | | 4 | |
|---|---|---|---|---|---|---|
| SECTOR OR POSITION | ENG. MANUAL THICKNESS REQUIREMENT* | | ACTUAL THICKNESS REQUIREMENT** | | SEGMENT THICKNESS ASSIGNED | |
| | (MILS) | (MM) | (MILS) | (MM) | (MILS) | (MM) |
| 1 | 544 | (13.82) | 557 | (14.15) | 573 | (14.55) |
| 2 | 544 | (13.82) | 557 | (14.15) | 570 | (14.48) |
| 3 | 546 | (13.87) | 559 | (14.20) | 570 | (14.48) |
| 4 | 548 | (13.92) | 561 | (14.25) | 571 | (14.50) |
| 5 | 550 | (13.97) | 563 | (14.30) | 573 | (14.55) |
| 6 | 552 | (14.02) | 565 | (14.35) | 573 | (14.55) |
| 7 | 556 | (14.12) | 569 | (14.45) | 574 | (14.58) |
| 8 | 560 | (14.22) | 573 | (14.55) | 575 | (14.60) |
| 9 | 562 | (14.27) | 575 | (14.60) | 600 | (15.24) |
| 10 | 565 | (14.35) | 578 | (14.65) | 625 | (15.87) |
| 11 | 568 | (14.43) | 581 | (14.76) | 607 | (15.42) |
| 12 | 572 | (14.53) | 585 | (14.86) | 611 | (15.52) |
| 13 | 572 | (14.53) | 585 | (14.86) | 615 | (15.62) |
| 14 | 574 | (14.58) | 587 | (14.91) | 618 | (15.70) |
| 15 | 574 | (14.58) | 587 | (14.91) | 621 | (15.78) |
| 16 | 572 | (14.53) | 585 | (14.86) | 618 | (15.70) |
| 17 | 571 | (14.50) | 584 | (14.83) | 610 | (15.49) |
| 18 | 570 | (14.48) | 583 | (14.81) | 610 | (15.49) |
| 19 | 570 | (14.48) | 583 | (14.81) | 627 | (15.93) |
| 20 | 570 | (14.48) | 583 | (14.81) | 608 | (15.44) |
| 21 | 569 | (14.45) | 582 | (14.78) | 608 | (15.44) |
| 22 | 566 | (14.38) | 579 | (14.71) | 606 | (15.39) |
| 23 | 565 | (14.35) | 578 | (14.65) | 605 | (15.37) |
| 24 | 561 | (14.25) | 574 | (14.58) | 576 | (14.63) |
| 25 | 560 | (14.22) | 573 | (14.55) | 575 | (14.60) |
| 26 | 559 | (14.20) | 572 | (14.53) | 574 | (14.58) |
| 27 | 554 | (14.07) | 567 | (14.40) | 573 | (14.55) |
| 28 | 553 | (14.05) | 566 | (14.38) | 612 | (15.54) |
| 29 | 552 | (14.02) | 565 | (14.35) | 573 | (14.55) |
| 30 | 550 | (13.97) | 563 | (14.30) | 572 | (14.53) |
| 31 | 543 | (13.79) | 556 | (14.12) | *553* | *(14.05)* |
| 32 | 541 | (13.74) | 554 | (14.07) | *551* | *(13.99)* |
| 33 | 540 | (13.72) | 553 | (14.05) | *550* | *(13.97)* |
| 34 | 541 | (13.74) | 554 | (14.07) | *549* | *(13.94)* |
| 35 | 543 | (13.79) | 556 | (14.12) | *552* | *(14.02)* |
| 36 | 544 | (13.82) | 557 | (14.15) | *554* | *(14.07)* |

\* BASED ON ASSUMED ROTOR DIAMETER OF 37.466 INCHES (951.64MM)
\*\* BASED ON MEASURED ROTOR DIAMETER OR 37.457 INCHES (951.41MM) AND .008 INCH (0.20MM) DISCRETIONARY OFFSET

FIG.5 TOP-DOWN EVALUATION
START WITH LARGEST "T"

| VACATED ANGULAR POSITION | THICKNESS REQ. OF VACATED POSITION | ITERATIONS | | |
|---|---|---|---|---|
| | | #1 | #2 | #3 |
| 36 | R6 (LARGEST) | X | X | X |
| 35 | R5 | X | X | X |
| 31 | R4 | X | X | X |
| 34 | R3 | T6 | X | X |
| 32 | R2 | | T5 | X |
| 33 | R1 (SMALLEST) | | | T4 |

FIG.6 BOTTOM-UP EVALUATION
START WITH LARGEST "T"

| VACATED ANGULAR POSITION | THICKNESS REQ. OF VACATED POSITION | ITERATIONS | | |
|---|---|---|---|---|
| | | #1 | #2 | #3 |
| 36 | R6 (LARGEST) | | | |
| 35 | R5 | | | |
| 31 | R4 | X | | |
| 34 | R3 | T6 | X | |
| 32 | R2 | — | T5 | X |
| 33 | R1 (SMALLEST) | — | — | T4 |

FIG.6A BOTTOM-UP EVALUATION
START WITH LARGEST "T"

| VACATED ANGULAR POSITION | THICKNESS REQ. OF VACATED POSITION | ITERATIONS | | |
|---|---|---|---|---|
| | | #1 | #2 | #3 |
| 36 | R6 (LARGEST) | | | |
| 35 | R5 | X | | |
| 31 | R4 | T6 | | |
| 34 | R3 | — | X | |
| 32 | R2 | — | T5 | X |
| 33 | R1 (SMALLEST) | — | — | T4 |

FIG. 7  BOTTOM-UP EVALUATION
START WITH SMALLEST "T"

| VACATED ANGULAR POSITION | THICKNESS REQ. OF VACATED POSITION | ITERATIONS | | | |
|---|---|---|---|---|---|
| | | #1 | #2 | #3 | #4 |
| 36 | R6 (LARGEST) | | | | X |
| 35 | R5 | | | | T6 |
| 31 | R4 | | | | — |
| 34 | R3 | | X | X | — |
| 32 | R2 | X | T4 | — | — |
| 33 | R1 (SMALLEST) | T3 | — | — | — |

FIG. 8  TOP-DOWN EVALUATION
START WITH SMALLEST "T"

| VACATED ANGULAR POSITION | THICKNESS REQ. OF VACATED POSITION | ITERATIONS | | | |
|---|---|---|---|---|---|
| | | #1 | #2 | #3 | #4 |
| 36 | R6 (LARGEST) | X | X | X | X |
| 35 | R5 | X | X | X | X |
| 31 | R4 | X | X | X | — |
| 34 | R3 | X | X | X | T6 |
| 32 | R2 | — | T4 | | |
| 33 | R1 (SMALLEST) | T3 | | | |

FIG.10

| NON-PINNED SEGMENTS | | | | PINNED SEGMENTS | | | |
|---|---|---|---|---|---|---|---|
| SEGMENT THICKNESS RECEIVED | MINIMUM THICKNESS REQUIRED* | DELTA | TARGET CASE POSITION | SEGMENT THICKNESS RECEIVED | MINIMUM THICKNESS REQUIRED* | DELTA | TARGET CASE POSITION |
| 0.621 | 0.587 | OK | 15 | 0.627 | 0.583 | OK | 19 |
| 0.618 | 0.587 | OK | 14 | 0.625 | 0.578 | OK | 10 |
| 0.618 | 0.585 | OK | 16 | 0.612 | 0.566 | OK | 28 |
| 0.615 | 0.585 | OK | 13 | 0.573 | 0.557 | OK | 1 |
| 0.611 | 0.585 | OK | 12 | | | | |
| 0.610 | 0.584 | OK | 17 | | | | |
| 0.610 | 0.583 | OK | 18 | | | | |
| 0.608 | 0.583 | OK | 20 | | | | |
| 0.608 | 0.582 | OK | 21 | | | | |
| 0.607 | 0.581 | OK | 11 | | | | |
| 0.606 | 0.579 | OK | 22 | | | | |
| 0.605 | 0.578 | OK | 23 | | | | |
| 0.600 | 0.575 | OK | 9 | | | | |
| 0.576 | 0.574 | OK | 24 | | | | |
| 0.575 | 0.573 | OK | 8 | | | | |
| 0.575 | 0.573 | OK | 25 | | | | |
| 0.574 | 0.572 | OK | 26 | | | | |
| 0.574 | 0.569 | OK | 7 | | | | |
| 0.573 | 0.567 | OK | 27 | | | | |
| 0.573 | 0.565 | OK | 6 | | | | |
| 0.573 | 0.565 | OK | 29 | | | | |
| 0.573 | 0.563 | OK | 5 | | | | |
| 0.572 | 0.563 | OK | 30 | | | | |
| 0.571 | 0.561 | OK | 4 | | | | |
| 0.570 | 0.559 | OK | 3 | | | | |
| 0.570 | 0.559 | OK | 31 | | | | |
| 0.570 | 0.557 | OK | 2 | | | | |
| 0.570 | 0.557 | OK | 35 | | | | |
| 0.570 | 0.557 | OK | 34 | | | | |
| 0.569 | 0.557 | OK | 33 | | | | |
| 0.567 | 0.557 | OK | 32 | | | | |
| 0.563 | 0.555 | OK | 36 | | | | |

*MINIMUM SEGMENT THICKNESS COMPUTED BASED ON A ROTOR DIAMETER OF: 37.457

| SUMMARY OF OUT-OF-LIMIT NON-PINNED SEGMENT THICKNESS | SUMMARY OF OUT-OF-LIMIT PINNED SEGMENT THICKNESS |
|---|---|
| NUMBER OF INITIAL BAD SEGMENTS: 0 | NUMBER OF INITIAL BAD SEGMENTS: 0 |
| NUMBER OF USABLE SEGMENTS: 32 | NUMBER OF USABLE SEGMENTS: 4 |
| NUMBER OF SEGMENTS NOT USABLE: 0 | NUMBER OF SEGMENTS NOT USABLE: 0 |

METHOD FOR DEPLOYING SHROUD SEGMENTS IN A TURBINE ENGINE

TECHNICAL FIELD

This invention relates to techniques for repairing turbine engines and particularly to a method for circumferentially distributing a population of shroud segments of nonuniform radial thickness in an engine module having a circumferentially nonuniform requirement for segment thickness.

BACKGROUND OF THE INVENTION

A typical aircraft gas turbine engine includes one or more turbine modules for extracting energy from a stream of working medium fluid. A representative turbine module includes a rotor comprising a rotatable hub disposed about a rotational axis or module centerline. An array of blades projects radially from the hub so that the individual blades span a working medium flowpath. The rotor has a diameter, which is the linear distance between the tips of radially opposing blades. An array of nonrotatable vanes, axially spaced from the blade array, also spans the flowpath. A case circumscribes the blade and vane arrays. The case includes a plurality of circumferentially distributed shroud or airseal segments secured to the interior of the case and axially aligned with the blade tips. Collectively, the segments define a substantially cylindrical shroud or airseal assembly that radially bounds the flowpath in the vicinity of the blade tips. The shroud assembly is radially spaced from the blade tips by a clearance gap. Engine designers strive to minimize the clearance gap because any working medium fluid that leaks through the gap instead of flowing over the surfaces of the blades degrades engine efficiency.

The shroud segments in modern generation engines are made of an abradable material. When a new engine (or one having new or reconditioned shroud segments) is first operated, centrifugal and thermal growth of the blades relative to the case causes the blade tips to carve a trench in the abradable material. Thereafter, the blade tips extend into the trench during engine operation to minimize fluid leakage. By contrast, older generation engines employ nonabradable shroud segments comprising a metallic substrate and a metallic surface layer deposited on the substrate by plasma spraying or other suitable means. The shroud segments and blades are carefully dimensioned to minimize the size of the clearance gap without actually coming into contact with each other.

One accepted method for building a turbine module for an older generation engine is to install a set of radially oversized shroud segments in the case and to then grind the installed segments to a smaller radial dimension compatible with the diameter of the rotor. The grinding operation is carried out with a grinding apparatus whose grinding tool follows a circular grind path at a prescribed radius from a grind centerline. For some turbines, the grind centerline may coincide with the module centerline so that the shroud assembly, as ground, is uniformly radially spaced from the module centerline. In other turbines, the grind centerline may be radially offset from the module centerline so that the radial spacing from the module centerline to the shroud assembly varies from point to point around the circumference of the module. This offset grind technique is used to compensate for predictable distortion of the case, and hence of the shroud assembly, occasioned when the engine is mounted on an aircraft.

The above described offset grind technique presents no problem as long as the installed shroud segments are radially thick enough to fall within the grind radius. For modules containing newly manufactured shroud segments, this condition is easily satisfied by establishing an appropriate lower limit on the radial dimension of the segments. However, when it is necessary to replace shroud segments that have deteriorated during normal use, many engine owners prefer to install refurbished segments rather than more costly, newly manufactured segments. A refurbished segment is one whose deteriorated metallic surface layer has been completely removed and replaced by a replacement surface layer deposited on the substrate metal. One material known to be suitable as a replacement is a nickel base alloy known as MARM-509. The MARM-509 alloy can be deposited on the substrate to a thickness up to about 95 mils. A segment refurbished with MARM-509 can therefore be made thick enough to fall within the grind radius of the grinding apparatus irrespective of the angular position where the segment is installed in the turbine case. Another suitable material is a nickel base alloy known as LCO-22. Refurbishment with LCO-22 is considerably less expensive than refurbishment with MARM-509, but the LCO-22 material can be successfully deposited on the metallic substrate up to a thickness of only about 50 mils. As a result, a segment refurbished with LCO-22 may not be universally suitable for use at all positions around the circumference of the case since, at some positions, it may be too thin to fall within the grind radius. This is undesirable because an unground segment introduces a discontinuity into the otherwise smoothly curved profile the shroud assembly. Moreover, the individual members in a group of refurbished segments are not all of equal thickness, thus complicating any attempt to strategically position the segments in the case. Nevertheless, many engine owners prefer the more economical LCO-22 refurbishment over the more expensive MARM-509 refurbishment.

Alternatively, an engine owner may elect to replace deteriorated shroud segments with serviceable, previously used segments. Previously used segments may be radially thinner than new segments due to erosion of the metallic surface layer during service or because of refinishing operations in which some of the surface layer has been removed to eliminate minor surface flaws such as cracks and pits. In addition, the individual members in a group of used segments differ in thickness. Thus, used segments present the same problems as LCO-22 refurbished segments.

According to past practice, used or refurbished segments are installed randomly in a turbine case. Subsequent to the above described offset grinding operation, a technician inspects the case to determine whether or not the grinding apparatus has ground all the segments. If not, as is often true if used or LCO-22 refurbished segments are employed, the segments are rearranged and/or substitute segments are installed in place of existing segments. The grind operation and subsequent inspection are repeated, but still with no guarantee of success. In extreme situations, several repetitions of the procedure might be required to achieve success. This repetitive process is tedious, time consuming and thus thoroughly unsatisfactory. The likelihood of success can be improved by using new segments or segments refurbished with MARM-509 as the substitute segments. However, either of these options increases the overall cost and threatens the economies sought by employing used or LCO-22 refurbished segments.

What is needed is a systematic method for allocating shroud segments among a set of positions in a turbine case to ensure that the largest possible quantity of segments falls within a prescribed grind radius and for identifying any unsuitable segments.

SUMMARY OF THE INVENTION

It is, therefore, an object of the invention to provide a method for systematically allocating a population of shroud segments among a set of positions in a turbomachinery case so that the largest possible number of segments fall within a prescribed grind radius.

According to the invention, a representative radial thickness associated with each segment selected from a population of segments is assigned to an angular position on the case, and each thickness is compared to the minimum thickness requirement of its assigned position. Any thickness value that fails to satisfy the minimum thickness requirement of its assigned position is consigned to a pool of available thickness values, thus vacating zero or more angular positions. The members of the pool are then evaluated for suitability in the vacated positions and members are assigned to vacated positions for which they are suitable.

The principal advantage of the invention is that it quickly identifies an optimum distribution of segments among the various angular positions in the module and therefore reduces the expense and time required to service a turbomachinery module. Accordingly, the method overcomes the disadvantages of employing used or inexpensively refurbished segments and so makes it more practical to use such segments.

The advantages and the operation of the inventive method will become clearer in view of the following description of the best mode for carrying out the invention and the accompanying illustrations.

BRIEF DESCRIPTION OF THE DRAWINGS

FIG. 4 is a tabulation showing an example of shroud minimum thickness requirements as a function of angular position and also showing an allocation of actual segment thickness values amongst the angular positions.

FIGS. 5–8 are tables each illustrating the principles of an evaluation sequence for assigning shroud thickness values to vacated positions or sectors in a turbine module.

FIG. 10 is an illustration of the output of the computer implementation of FIG. 9.

BEST MODE FOR CARRYING OUT THE INVENTION

Figure 1:
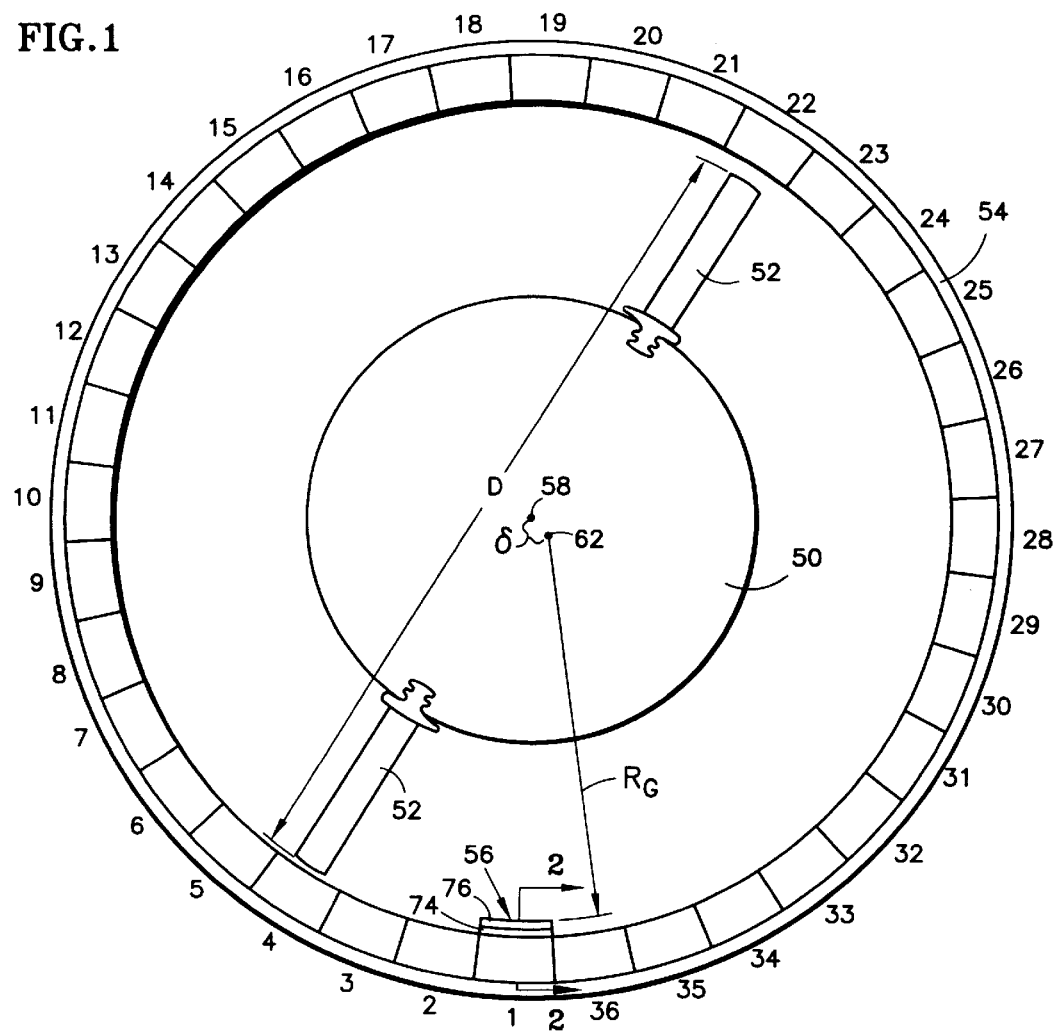
FIG. 1 is a schematic view of a gas turbine engine turbine module viewed parallel to the module centerline and showing a plurality of sectors for receiving shrouds or airseal segments.
Figure 2:
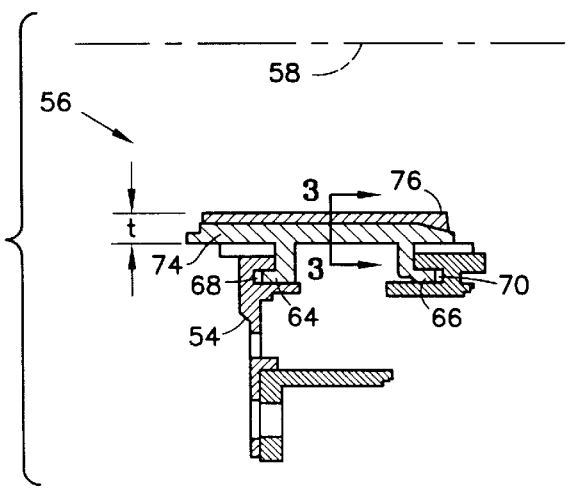
FIG. 2 is a side elevation view of a typical shroud or airseal segment viewed in the direction 2—2 of FIG. 1.
Figure 3:
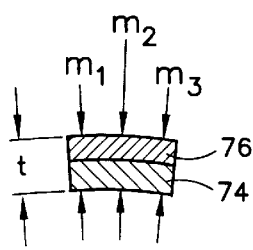
FIG. 3 is a view of the shroud segment taken in the direction 3—3 of FIG. 2.

Referring to FIGS. 1–3, a high pressure turbine module for an aircraft gas turbine engine includes a rotor comprising a rotatable hub 50 and an array of blades of which only two representative blades 52 are illustrated. A case 54 circumscribes the rotor. The case has thirty six defined sectors, consecutively numbered 1–36, each subtending an arc of about 10°. In a fully assembled module, each sector receives an airseal or shroud segment 56 3described in more detail below. Collectively, the installed shroud segments define a shroud or airseal assembly radially spaced from the tips of the blades. The sectors numbered 1, 10, 19 and 28 are referred to as pinned sectors. The pinned sectors receive pinned shroud segments secured to the case by retaining pins to prevent the segments from sliding circumferentially during engine operation. The remaining thirty two sectors are referred to as nonpinned sectors. The nonpinned sectors receive nonpinned segments that are prevented from sliding circumferentially by the pinned segments. The module has centerline 58, which is also the rotational axis of the rotor. A grind centerline 62 is the center of a circular grind path of prescribed radius $R_G$. The grind centerline is offset from the module centerline by an offset distance $\delta$ in the direction of sector 33. Accordingly, a segment of any given thickness, if installed at angular position 33, is more likely to fall within the grind radius than if the segment were installed at angular position 15. More importantly, an excessively thin segment installed at position 15 would fall outside the grind radius. The unground segment would introduce an undesirable discontinuity into the otherwise smoothly contoured profile of the shroud assembly.

Each shroud segment 56 includes forward and aft hooks, 64, 66 that engage corresponding recesses 68, 70 in the case. A typical shroud segment is made of a substrate metal 74 and has a metallic surface layer 76 plasma sprayed onto the substrate. The segment has a representative radial dimension or thickness t. Since an individual segment may exhibit some variation in thickness, the representative thickness is the minimum of three thickness measurements $m_1$, $m_2$ and $m_3$ taken near the circumferential extremities and circumferential center of the segment. In general, and especially for a population of used or refurbished segments, the representative thickness t will vary from segment to segment. Accordingly, random installation of the segments may cause several segments to fall outside the prescribed grind radius even though a larger quantity of the segments could be made to fall within the grind radius if the segments were more judiciously positioned in the module.

The inventive method will now be explained by reference to a specific example related to the JT9D-7 model aircraft engine manufactured by the assignee of the present application. As seen in FIG. 4, The engine maintenance manual establishes a segment minimum thickness requirement as a function of angular position on the turbine case. In FIG. 4, the pinned sectors and their corresponding thickness requirements are distinguished from their nonpinned counterparts by boldface type. The thickness requirement assumes that the rotor diameter D, i.e. the distance between the tips of radially opposing blades as illustrated in FIG. 1, is 37.466 inches. This minimum thickness requirement accounts for the magnitude and direction of the grind offset $\delta$. Accordingly, the smallest minimum thickness requirement occurs at sector 33, the sector circumferentially aligned with the direction of offset $\delta$, and increases in both the clockwise and counterclockwise directions to a maximum at sector 15.

In the e present example, the actual rotor diameter measured by a repair technician is 37.457 inches, about 9 mils smaller than the 37.466 inch assumed rotor diameter used to establish the maintenance manual minimum thickness requirement . The corresponding radial difference is half the diametral difference or about 5 mils. Accordingly, the thickness requirement dictated by the engine manual is incremented by 5 mils to account for the smaller radial dimension of the actual rotor in comparison to the nominally sized rotor upon which the maintenance manual minimum thickness requirement is based. The thickness requirement is also incremented by a discretionary 8 mils to help ensure that the segments will fall within the prescribed grind radius. Thus, the actual minimum thickness requirement for the engine module of interest is 13 mils larger than the requirement spelled out in the maintenance manual. This actual requirement is shown in column 3 of FIG. 4.

The representative radial thicknesses of a population of thirty six segments is determined by selecting the minimum of three thickness measurements, $m_1$, $m_2$, $m_3$ as described above. Each segment is marked with its representative measurement to facilitate future identification. An example of thirty six thickness values is shown in column 4 of FIG. 4. Disregarding for the moment the pinned segments and the pinned positions (indicated by boldface type) the representative thickness values of the nonpinned segments are each preliminarily assigned to an angular position on the case as shown in column 4 of FIG. 4. Ideally, the representative thicknesses are sorted in order of descending magnitude and the largest thickness, 621 mils, is assigned to position 15, the position with the largest minimum requirement. The next two thicknesses, both 618 mils, are assigned to positions 14 and 16, the positions with the next two largest thickness requirements, 587 and 585 mils respectively. The next two largest thicknesses, 615 and 611 mils, are assigned to positions 13 and 12, and so forth until all the nonpinned segments have been assigned. These preliminary assignments occur without regard for whether or not a thickness value satisfies the minimum thickness requirement of its assigned position. The thickness values of the pinned segments are treated as a separate population of thickness values and are similarly assigned to pinned positions 1, 10, 19 and 28.

Each representative radial thickness is then compared to the minimum thickness requirement of its assigned angular position. Any representative thickness that fails to satisfy the minimum thickness requirement of its assigned angular position is consigned to a pool of noncompliant thickness values so that zero or more angular positions are vacated. A position is "vacated" or "vacant" when there is no suitable thickness value assigned to that position immediately after the above described comparison and consignment operation. In the example shown in FIG. 4, nonpinned positions 31–36 are considered to be vacated because the thickness preliminarily assigned to each position is less than the minimum thickness required by that position. These segment thickness values are italicized in the table to emphasize that they do not comply with the requirement of their assigned position and that they have been consigned to the noncompliant pool.

The members of the noncompliant pool are then evaluated for suitability in the vacated positions and assigned to positions for which they are suitable. One way to carry out the evaluation is to evaluate the pool members in order of diminishing thickness. This may be accomplished by evaluating the largest member of the pool for suitability in the vacated positions and, in the event that that largest member has a representative radial thickness at least as great as the minimum thickness requirement of a vacated position, assigning the largest member to that vacated position. This reduces membership in the pool by one and creates a new largest member. The evaluating step is repeated until the largest member is unassignable to a vacated position because of being to thin to meet any remaining requirement. For the preliminary assignments shown in FIG. 4, only the nonpinned positions would require evaluation because the earlier comparison step would have revealed that the thickness values assigned to all the pinned positions (boldface type) satisfied the minimum thickness requirements of those positions. Otherwise, the evaluating step would also be carried out independently on the vacated pinned positions using noncompliant thickness values of pinned segments.

A specific embodiment of the above described inventive method is to evaluate the largest member of the pool for suitability in the vacated positions by sequentially comparing the representative thickness of the largest member to the thickness requirements of the vacated positions, beginning with the vacated position having the largest thickness requirement and progressing through the thickness requirements in descending order. Upon first identifying a conformance between the thickness of the thickest member and the thickness requirement of a vacated position, the largest member is assigned to that vacated position, thus reducing membership in the pool by one and creating a new largest member. The evaluation step is then repeated until the largest member is unassignable to a vacated position. Unassignability typically occurs either because the largest member has a thickness smaller than the smallest of the minimum thickness requirements or because a thickness has already been assigned to the position having the smallest requirement in a previous iteration through the evaluation sequence.

Figure 9:
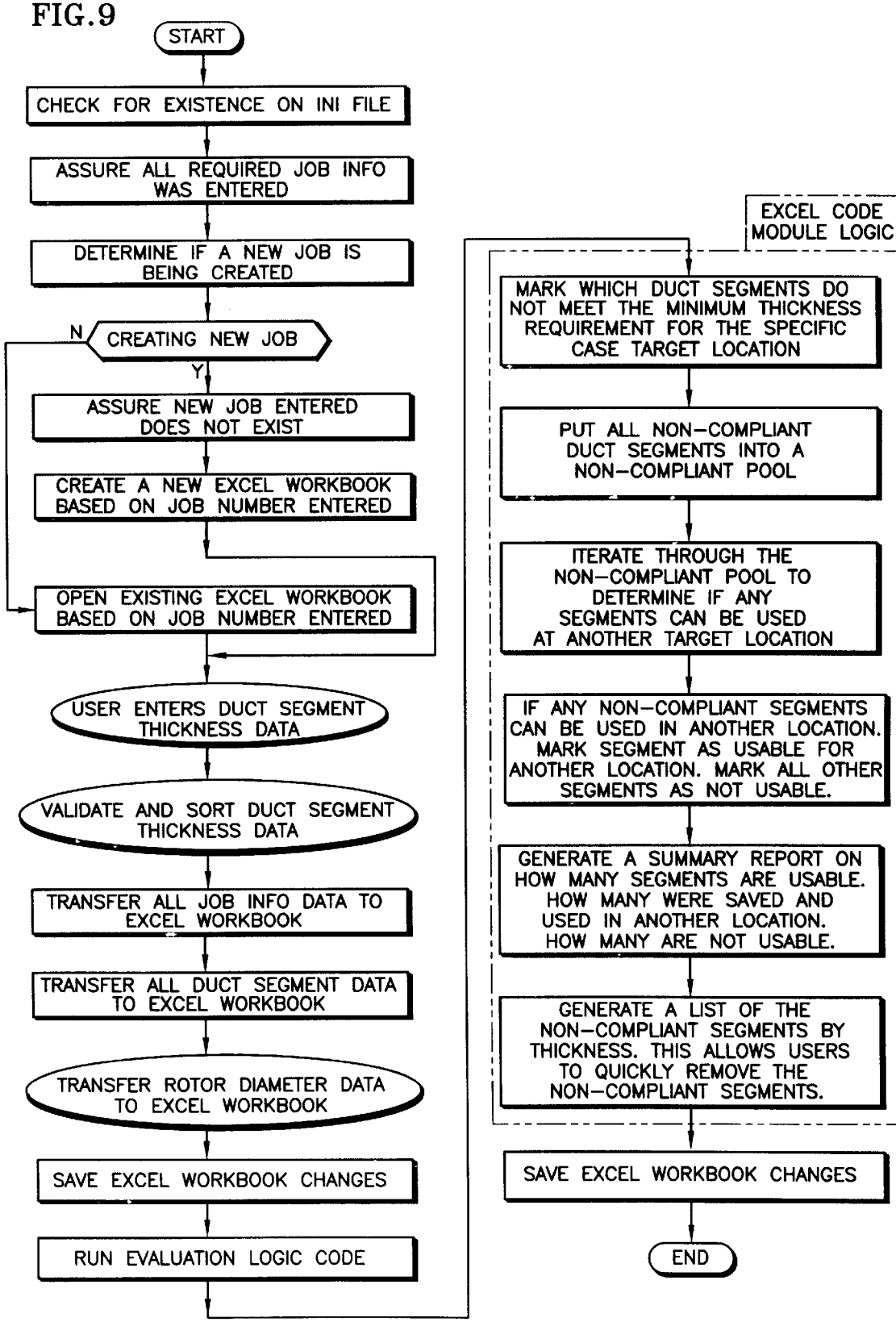
FIG. 9 is a flow chart illustrating a computerized implementation of the inventive method.

The inventive method is readily automated with modern computational tools. FIG. 9 shows one possible implementation in which a Visual Basic user interface accepts and validates user input data. A Microsoft® Excel spreadsheet (enclosed within a broken-line border) carries out the comparisons and evaluations FIG. 10 shows the output of a computerized evaluation in which all of the thickness requirements were able to be satisfied by the available thicknesses Upon completion of the above described method, the segments corresponding to each of the representative thicknesses may then be deployed in the appropriate sectors in the turbine case. In general, one or more sectors will be unoccupied, making it necessary to fill the unoccupied sectors with a segment known to be sufficiently thick, possibly a more costly new or refurbished segment. However the systematic nature of the above described allocation method minimizes the number of such segments that must be employed.

A second embodiment of the inventive method is to evaluate the largest member of the pool for suitability in the vacated positions by sequentially comparing the representative thickness of the largest member to the thickness requirements of the vacated positions beginning with the vacated position having the smallest minimum thickness requirement and progressing through the thickness requirements in ascending order. Upon first identifying a vacated position unsuitable for the largest member, that member is assigned to a preceding eligible vacated position in the evaluation sequence. A vacated position is considered eligible if its minimum thickness requirement is less than the thickness value under consideration and if a thickness value has not been previously assigned to that position in an earlier iteration through the evaluation sequence. Assignment of a thickness value reduces membership in the pool by one and creates a new largest member. The evaluation step is then repeated until the largest member is unassignable to a vacated position. Unassignability typically occurs either because the largest member has a thickness smaller than the smallest thickness requirement or because the smallest thickness requirement had been previously satisfied in an earlier iteration through the evaluation sequence.

The tables shown in FIGS. 6 and 6A illustrate the above described second embodiment. A "--" entry indicates that the pool member being considered has a thickness value large enough to satisfy the minimum requirement, but that the thickness will also satisfy a larger requirement. An "X" entry reveals that the member under consideration is insufficiently thick to meet the requirement. For example, in the first iteration shown in FIG. 6, thickness T6 is compared sequentially to requirements R1, R2, R3 and R4 to reveal that T6 is dimensionally unsuitable for requirement R4. Hence, thickness T6 is assigned to R3, the immediately preceding eligible vacated position in the evaluation sequence. In the second iteration, the new largest thickness, T5, is compared sequentially to R1, R2 and R3. T5 is unsuitable for R3 because, irrespective of the magnitude of T5 relative to requirement R3, thickness T6 had been previously assigned to R3. Hence, T5 is assigned to R2. In the third iteration, T4 is assigned to R1. Since all the other pool members have a thickness no larger than T4, none of those segments are suitable for any remaining vacated position. FIG. 6A shows a similar evaluation except that T5 is found to be unsuitable for R3, not because R3 had been previously matched with a suitable thickness, but because T5 is insufficiently thick to satisfy R3.

Because the inventive method seeks to match each thickness requirement with a thickness that is at least as large as the requirement, it is most effective to consider the members of the noncompliant pool in order of diminishing magnitude, i.e. beginning with the largest thickness and working toward the smallest thickness. Accordingly, once a thickness is matched with a requirement of a vacated position, it is clear that none of the remaining thicknesses could possibly satisfy any of the remaining larger requirements. If, alternatively, the evaluation proceeds from the smallest thickness toward the largest thickness it is possible to identify an allocation of thicknesses that fails to use the maximum possible quantity of members from the pool of noncompliant members. Nevertheless, the evaluation can, in principle, proceed from the smallest thickness to the largest thickness. This may be accomplished by evaluating the smallest member for suitability in the vacated positions and, in the event that that smallest member has a representative radial thickness at least as great as the minimum thickness requirement of a vacated position, assigning that representative thickness to that vacated position. This reduces membership in the pool by one and creates a new smallest member. The evaluating step is repeated until none of the remaining unassigned members of the pool is assignable to a vacated position.

Thus, a third specific embodiment of the inventive method is to evaluate the smallest member of the pool for suitability in the vacated positions by sequentially comparing the representative thickness of the smallest member to the thickness requirements of the vacated positions, beginning with the vacated position having the smallest thickness requirement and progressing through the thickness requirements in ascending order. Ideally, the pool members are first scrutinized to identify any pool member whose thickness value is less than the smallest of the minimum thickness requirements of the vacated positions. The identified members are withdrawn from consideration and are not treated as members of the pool during the subsequent evaluations. Upon first identifying a vacated position dimensionally unsuitable for the smallest member, that member is assigned to a preceding eligible vacated position in the evaluation sequence. A vacated position is considered eligible if its minimum thickness requirement is smaller than the thickness value of the pool member under consideration and if a thickness has not already been assigned to that position in an earlier iteration through the evaluation sequence. Assignment of a thickness value reduces membership in the pool by one and creates a new smallest member. The evaluation step is then repeated until none of the remaining, unassigned members of the noncompliant pool is assignable to a vacated position. Unassignability typically occurs because none of the remaining members have a thickness large enough to satisfy any of the vacated positions that have not already been satisfied by an earlier iteration through the evaluation sequence.

The table of FIG. 7 illustrates the above described third embodiment of the invention. A "--" entry indicates that the pool member being considered has a thickness value large enough to satisfy the minimum requirement, but that the thickness value will also satisfy a larger requirement. An "X" entry reveals that the member was insufficiently thick to meet the requirement. In the example of FIG. 7, thickness T1 and T2 have been withdrawn from consideration because both thickness values were smaller than the smallest thickness requirement, R1. This leaves T3 as the smallest member. T3 is compared sequentially to requirements R1, and R2 to reveal that T3 is dimensionally unsuitable for R2 because T3 is smaller than R2. Hence, T3 is assigned to R1, a preceding eligible position in the evaluation sequence. In the example shown, the preceding position for which T3 is suitable is the immediately preceding position in the evaluation sequence. In the second iteration, the new smallest thickness T4 is compared sequentially to R1, R2 and R3 (or alternatively just to R2 and R3) to reveal that T4 is too small for R3. Hence, T4 is assigned to R2, a preceding eligible vacated position. In the third iteration, T5 is compared sequentially to R1, R2 and R3 (or alternatively just to R3) to reveal that T5 is too small for R3. Since requirements R1 and R2 have been previously matched with thicknesses T3 and T4, there is no position eligible for T5, and so T5 is removed from the noncompliant pool. In the fourth iteration, T6 is compared sequentially to requirements R1 through R6 to reveal that T6 is too small for R6. Hence, T6 is assigned to R5. Note that if T5 had been previously assigned to R5 in the third iteration, T6 would have then been assigned to R4 or R3 because R5 would have been ineligible for T6.

A fourth embodiment of the inventive method is to evaluate the smallest member of the pool for suitability in the vacated positions by sequentially comparing the representative thickness values of the smallest member to the thickness requirements of the vacated positions beginning with the vacated position having the largest minimum thickness requirement and progressing through the thickness requirements in descending order. Ideally, the pool members are first scrutinized to identify any pool member whose thickness value is less than the smallest of the minimum thickness requirements of the vacated positions. The identified members are withdrawn from consideration and are not treated as members of the pool during subsequent evaluations. Upon first identifying a conformance between the smallest member and the minimum thickness requirement of a vacated position, that member is assigned to an eligible vacated position. The eligible vacated positions are the positions with thickness requirements no greater than that of the position corresponding to the first identified conformance (including that first identified position) and that have not been previously satisfied in an earlier iteration through the evaluation sequence. The evaluation step is repeated until none of the remaining, unassigned members of the pool is assignable to a vacated position. Unassignability typically occurs because none of the remaining pool members has a large enough thickness value to satisfy any of the vacated positions that have not already been satisfied by a previous iteration through the evaluation sequence.

The table of FIG. 8 illustrates an example of the above described fourth embodiment. An "X" entry indicates that the pool member being considered is not thick enough to satisfy the requirement, but may be thick enough to satisfy a smaller requirement. A "--" entry reveals that the member can satisfy the requirement, but will also satisfy a smaller requirement. In the example, T1 and T2 have been withdrawn from consideration because both thickness values are smaller than the smallest thickness requirement R1. This leaves T3 as the smallest member of the pool. T3 is compared sequentially to the thickness requirements, beginning with requirement R6. Requirement R2 is the first requirement that conforms to T3. Hence, all the positions whose thickness requirement is no greater than R2, (i.e. R2 and R1) are eligible positions for T3. T3 is therefore assigned to the eligible position having the smallest requirement, R1. In the second iteration, T4 is compared sequentially to the requirements, beginning with R6. The first identified conformance occurs at R2. The only position eligible for T4 is the position corresponding to R2 because the position corresponding to R1 has been satisfied by T3 in the previous iteration through the evaluation sequence. In the third iteration, T5 is too thin to satisfy R6, R5, R4 and R3. Since T5 is at least as large as T4, it is dimensionally suitable for R2 and R1. However, R2 and R1 are ineligible for T5 because R2 and R1 have already been satisfied by T4 and T3 during the third iteration. Therefore, T5 is removed from the noncompliant pool. In the fourth iteration, both R4 and R3 are eligible for T6.

The inventive method is readily automated with modern computational tools. FIG. 9 shows one possible implementation in which a Visual Basic user interface (shaded flow chart boxes against a white background) accepts and validates user input data. A Microsoft® Excel spreadsheet (shaded flow chart boxes against a black background) carries out the comparisons and evaluations. FIG. 10 shows the output of a computerized evaluation in which all of the thickness requirements were able to be satisfied by the available thicknesses.

Although the invention has been described with reference to a preferred embodiment thereof, those skilled in the art will appreciate that various changes, modifications and adaptations can be made without departing from the invention as set forth in the accompanying claims. For example, although the invention has been described in the context of allocating airseal or shroud segments in a turbine module, its applicability extends to the allocation of similar hardware elements in other types of turbomachinery cases, such as compressor cases. In addition, the invention applies to grind setups other than the simple offset grind described above. For example, the inventive method can also be used with a compound offset grind in which an initial grind is conducted with a first offset $\delta_1$ in a first direction followed by a second grind with a second offset $\delta_2$ in a second direction.

We claim:

1. A method for allocating shroud segments, each having a representative radial thickness, among positions in a turbomachinery case, comprising:

determining a minimum shroud segment thickness requirement as a function of angular position on the turbine case;

assigning each representative radial thickness to an angular position on the case;

comparing each representative radial thickness to the minimum thickness requirement of its assigned angular position and consigning each representative radial thickness that is less than the minimum thickness requirement of its assigned angular position to a pool of noncompliant radial thickness values thereby vacating zero or more angular positions; and evaluating members of the pool for suitability in the vacated positions, and assigning members to vacated angular positions for which the members are suitable.

2. The method of claim 1 wherein the evaluating step comprises:

identifying the pool's largest member;

evaluating the largest member of the pool for suitability in the vacated positions and, in the event that the largest member has a representative radial thickness at least as great as the minimum thickness requirement of a vacated position, assigning that representative thickness to that vacated position, thereby reducing membership in the pool and creating a new largest member; and repeating the evaluating step until the largest member is unassignable to a vacated position.

3. The method of claim 2 wherein the evaluating step comprises:

evaluating the largest member of the pool for suitability in one or more vacated positions, the evaluation progressing in descending order through the minimum thickness requirements of the one or more vacated positions and, upon first identifying a conformance between the largest member and the minimum thickness requirement of a vacated position, assigning that largest member to that vacated position, thereby reducing membership in the pool and creating a new largest member; and repeating the evaluating step until the largest member is unassignable to a vacated position.

4. The method of claim 2 wherein the evaluating step comprises:

evaluating the largest member of the pool for suitability in one or more vacated positions, the evaluation progressing in ascending order through the minimum thickness requirements of the one or more vacated positions and, upon first identifying a position unsuitable for the largest member of the pool, assigning that largest member to a preceding eligible vacated position in the evaluation sequence; and repeating the evaluating step until the largest member is unassignable to a vacated position.

5. The method of claim 1 wherein the evaluating step comprises:

identifying the pool's smallest member;

evaluating the smallest member of the pool for suitability in the vacated positions and, in the event that the smallest member has a representative radial thickness at least as great as the minimum thickness requirement of a vacated position, assigning that representative thickness to that vacated position, thereby reducing membership in the pool and creating a new smallest member; and repeating the evaluating step until none of the members of the pool is assignable to a vacated position.

6. The method of claim 5 wherein the evaluating step comprises:

evaluating the smallest member of the pool for suitability in one or more vacated positions, the evaluation progressing in ascending order through the minimum thickness requirements of the one or more vacated positions and, upon first identifying a position unsuitable for the smallest member of the pool, assigning that smallest member to a preceding eligible vacated position in the evaluation sequence; and repeating the evaluating step until none of the members of the pool is assignable to a vacated position.

7. The method of claim 5 wherein the evaluating step comprises:

evaluating the smallest member of the pool for suitability in one or more vacated positions, the evaluation progressing in descending order through the minimum thickness requirements of the one or more vacated positions and, upon first identifying a conformance between the smallest member and the minimum thickness requirement of a vacated position, assigning that smallest member to an eligible vacated position, thereby reducing membership in the pool and creating a new smallest member; and repeating the evaluating step until none of the unassigned members of the pool is assignable to a vacated position.

* * * * *